M. C. VOLK.
APPARATUS FOR LOADING CARS.
APPLICATION FILED MAY 13, 1909.
966,493.
Patented Aug. 9, 1910.
2 SHEETS—SHEET 1.
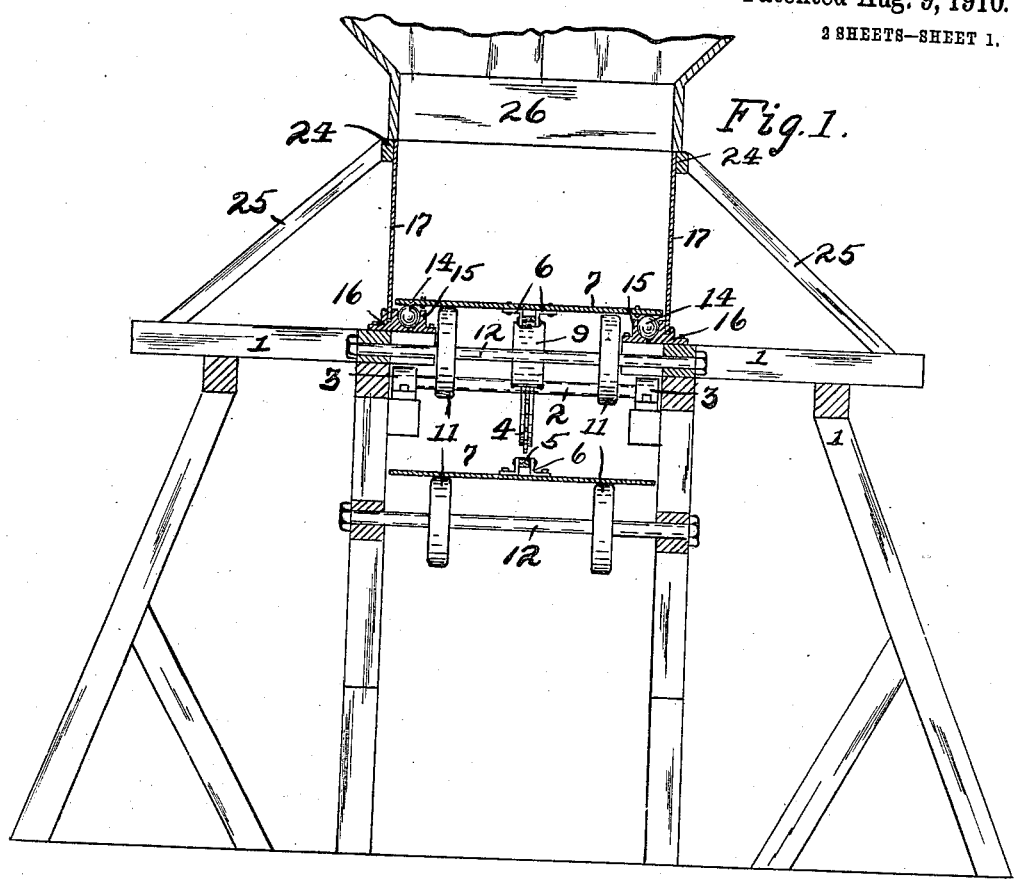
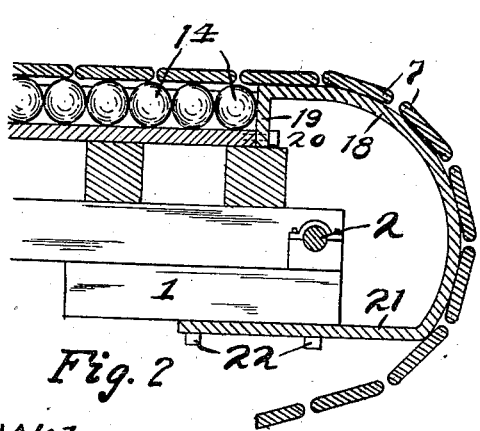
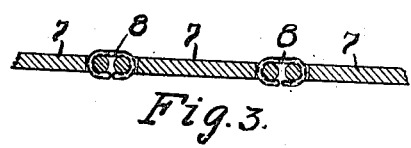
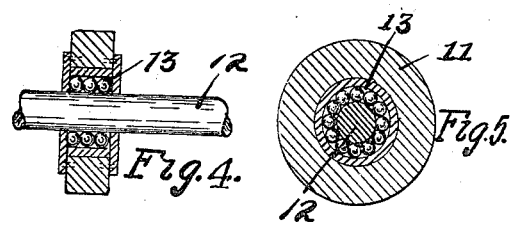
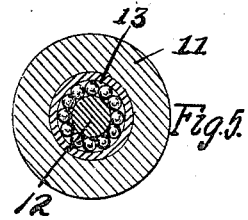
Witnesses
B. G. Richards
W. E. Smith
Inventor
Max C. Volk
By Joshua R. H. Potts
Attorney

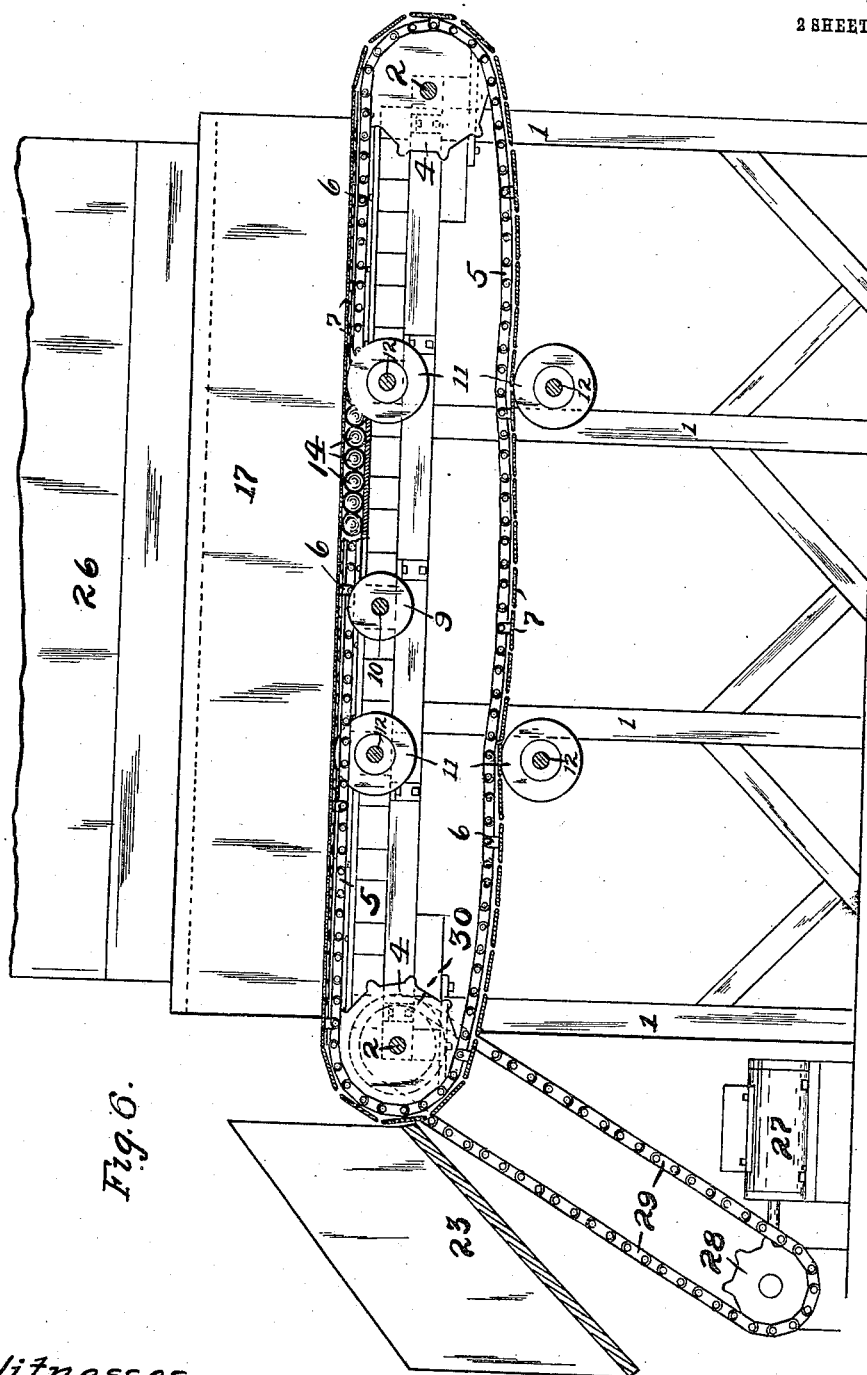

UNITED STATES PATENT OFFICE.

MAX C. VOLK, OF CHICAGO, ILLINOIS.

APPARATUS FOR LOADING CARS.

966,493.  Specification of Letters Patent.  Patented Aug. 9, 1910.

Application filed May 13, 1909. Serial No. 495,803.

*To all whom it may concern:*

Be it known that I, MAX C. VOLK, a citizen of the United States, residing at Chicago, county of Cook, and State of Illinois, have invented certain new and useful Improvements in Apparatus for Loading Cars, of which the following is a specification.

My invention relates to improvements in apparatus for loading cars and has for its object the production of such apparatus as shall be of simple and economical construction and effective in operation.

Figure 1, a vertical cross section through the apparatus, Fig. 2, an enlarged section through an end guide of the apparatus, Fig. 3, an enlarged section through the conveyer, Figs. 4 and 5, detail sections through the wheels for supporting the conveyer, and Fig. 6, a longitudinal section of the apparatus.

At either end of a suitable frame or trestle 1 is rotatably mounted a shaft 2 in bearings 3. Shafts 2 carry sprocket wheels 4 over which passes a sprocket chain 5. At intervals the chain 5 is provided with lugs 6 securing it to elongated plates or slats 7 which are hinged together by links 8 to form a traveling carrier. A supporting wheel 9 mounted upon a rotatable shaft 10 supports the sprocket chain at or near its middle and a series of eight wheels 11 on rods 12 support the conveyer above and below. Wheels 11 are preferably mounted on a rod 12 through the medium of ball bearing 13. At either side of the frame 1 balls 14 are placed in a channel formed between the two members 15 and 16 and project there above to contact with the conveyer to give it a continuous support while under load and relieve friction. The members 16 are each provided with a longitudinal slot adapted to receive the lower end of a side board 17. At each end of the ball channels an end guide 18 having substantially the same curvature as the sprocket wheel 4 is secured to members 15 and 16 by means of flange 19 and bolts 20 and to the frame by means of projection 21 and bolts 22. A discharge chute 23 is suitably mounted at the discharge end of the conveyer and is adapted to receive and discharge coal from the conveyer. Each of the side boards 17 is provided with a reinforcing rail 24 along its upper edge and braces 25 for holding it in upright position. A hopper 26 is adapted to receive and discharge coal on to the conveyer between the side boards. The conveyer is operated by means of an engine 27 driving a sprocket wheel 28 connected by means of a chain 29 with a sprocket wheel 30 on shaft 2.

In use it is intended that the hopper 26 be placed to receive the coal directly from the mine and that discharge chute 23 be so located as to discharge into cars on a track. In this manner it will be seen that the coal from the mine may be quickly and economically transferred to cars and that the apparatus is of strong and simple construction operating with little friction.

While I have illustrated and described the preferred construction of carrying my invention into effect this is capable of modification and variation without departing from the spirit of the invention. I, therefore, do not wish to be limited to the exact details of construction set forth, but wish to avail myself of such changes and modifications as come within the scope of the appended claims.

Having described my invention what I claim as new and desire to secure Letters Patent is:

1. In a device of the class described, the combination of a suitable frame; sprocket wheels on said frame; a sprocket chain traveling over said sprocket wheels; a rotatable wheel supporting said sprocket chain; a conveyer comprising a series of slats hinged together; connections between said slats and said sprocket chain; a race of balls supporting the slats at each side; rotatable wheels also supporting the slats; and means for operating said sprocket chain, substantially as described.

2. In a device of the class described, the combination of a suitable frame; sprocket wheels on said frame; a sprocket chain adapted to travel over said sprocket wheels; a rotatable wheel supporting the sprocket chain; a conveyer comprising a series of slats hinged together; members located under either side of the slats and provided with channels for the reception of balls adapted to support the slats; end guides of substantially the same curvature as the sprocket wheels and adapted to guide said slats as they follow said chain around the sprocket wheels; rotatable wheels also supporting the slats; and means for driving one of the sprocket wheels, substantially as described.

In testimony whereof I have signed my name to this specification in the presence of two subscribing witnesses.

MAX C. VOLK.

Witnesses:
JOSHUA R. H. POTTS,
ARTHUR A. OLSON.